United States Patent

Evans et al.

[11] Patent Number: 6,136,080
[45] Date of Patent: Oct. 24, 2000

[54] CATIONIC AZO DYE FOR INK JET INK

[75] Inventors: Steven Evans; Csaba A. Kovacs, both of Rochester; Helmut Weber, Webster, all of N.Y.

[73] Assignee: Eastman Kodak Company, Rochester, N.Y.

[21] Appl. No.: 09/299,412

[22] Filed: Apr. 26, 1999

[51] Int. Cl.$^7$ .................................................... C09D 11/02
[52] U.S. Cl. .................................... 106/31.5; 106/31.58
[58] Field of Search .............................. 106/31.5, 31.49, 106/31.58; 534/774, 790, 607; 548/483, 490, 491

[56] References Cited

U.S. PATENT DOCUMENTS

| | | | |
|---|---|---|---|
| 4,138,570 | 2/1979 | Psaar | 534/790 |
| 4,201,707 | 5/1980 | Psaar | 534/790 |
| 4,382,801 | 5/1983 | Loew | 534/607 |
| 4,388,115 | 6/1983 | Sugiyama et al. | 106/31.5 |
| 4,425,162 | 1/1984 | Sugiyama et al. | 106/31.5 |
| 4,929,277 | 5/1990 | Tanaka et al. | 106/31.5 |
| 5,560,996 | 10/1996 | Ito et al. | 428/500 |

FOREIGN PATENT DOCUMENTS 624 628 A1  5/1993  European Pat. Off.

*Primary Examiner*—Helene Klemanski
*Attorney, Agent, or Firm*—Harold E. Cole

[57] ABSTRACT

An ink jet ink composition comprising water, a humectant, and a cationic azo dye derived from the quaternization of a pyrazoleazoindole dye.

11 Claims, No Drawings

CATIONIC AZO DYE FOR INK JET INK

FIELD OF THE INVENTION

This invention relates to a certain cationic azo dye useful as a colorant in an ink jet ink composition.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant, which is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic co-solvents and high boiling organic solvents, such as hydrocarbons, esters, ketones, etc.

The choice of a colorant in ink jet systems is critical to image quality. For colors such as cyan, magenta, yellow, green, orange, etc., the peak wavelength ($\lambda$-max), the width of the absorption curve and the absence of secondary absorptions are important. The colorant should also have a high degree of light fastness after printing onto the ink-receiving element. For aqueous dye-based inks, the dye needs to be sufficiently soluble in water to prepare a solution that is capable of producing adequate density on the receiving element and stable for extended periods of storage without precipitation. High quality ink jet printing with dye-based inks requires dyes which will provide both bright hue and good light stability. It is difficult to find dyes, particularly yellow dyes, which meet all of these requirements.

Aqueous dye-based inks for high-quality, photo-realistic, ink jet printing require water-soluble dyes with excellent color and high light- and water-fastness. Typically the dyes are chosen from acid, direct and reactive dyestuffs developed for the dyeing of natural fibers such as paper, wool and cotton. Water solubility of these dyes is due to the incorporation of negatively charged substituent groups such as sulfo or carboxy.

Another group of dyes are basic or cationic dyes which were developed mainly for the dyeing of synthetic textile fibers such as acrylics and acid-modified polyesters. These dyes are positively charged, due to either the incorporation of pendant, positively-charged substituent groups, such as tetraalkylammonium or by virtue of the basic chromophore comprising a delocalized cationic system such as a cyanine, azacyanine or azo (diazacyanine).

U.S. Pat. No. 5,560,996 discloses a variety of cationic dyes, including cationic azo dyes such as Basic Yellow 25 and other cationic yellow dyes such as Basic Yellow 2 and Basic Yellow 11 for use in an ink jet ink. However, there is a problem with these dyes as will be shown hereafter, in that they have poor water solubility, color and/or light stability.

EPA 624628 describes the synthesis and use of quaternized pyrazoleazoindole cationic yellow dyes in the conventional dyeing of textiles. However, there is no disclosure in this reference that these dyes may be used in an ink jet ink composition.

It is an object of this invention to provide bright, water soluble and light stable cationic yellow dyes useful for aqueous ink jet printing.

SUMMARY OF THE INVENTION

This and other objects are achieved in accordance with this invention which relates to an ink jet ink composition comprising water, a humectant, and a cationic azo dye derived from the quaternization of a pyrazoleazoindole dye.

It has been found that quaternized pyrazoleazoindole cationic yellow dyes offer a combination of color, water solubility and light stability superior to the cationic yellow dyes of the prior art.

DETAILED DESCRIPTION OF THE INVENTION

In a preferred embodiment of the invention, the quaternized pyrazoleazoindole cationic yellow dye may be represented by the following structure:

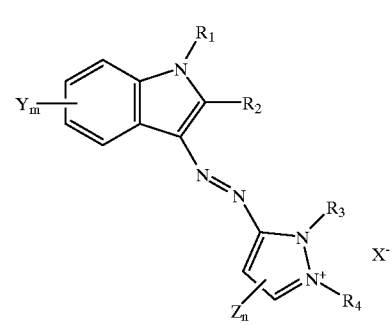

wherein:

$R_3$ and $R_4$ each independently represents a substituted or unsubstituted alkyl group of 1–6 carbon atoms, a substituted or unsubstituted allyl group, a substituted or unsubstituted aryl group of 6–10 carbon atoms, a substituted or unsubstituted hetaryl group of 5–10 atoms or a polyoxyalkylene group of 2–20 alkylene oxide residues;

$R_1$ represents hydrogen or the same groups as listed above for $R_3$ and $R_4$;

$R_2$, Y and Z each independently represents the same groups listed above for $R_1$, halogen, nitro, cyano, a substituted or unsubstituted alkoxy group of 1–6 carbon atoms, a substituted or unsubstituted alkoxy- or aryloxy-carbonyl group of 1–10 carbon atoms, carbamoyl, a substituted or unsubstituted alkyl-, aralkyl-, aryl-, diaryl- or dialkyl-carbamoyl group of 1–20 carbon atoms, sulfamoyl, a substituted or unsubstituted alkyl-, aralkyl-, aryl-, diaryl- or dialkyl-sulfamoyl group of 1–20 carbon atoms, acylamino, ureido, sulfonylamino, amino, a substituted or unsubstituted alkyl-, aralkyl-, aryl-, diaryl- or dialkyl-amino group of 1–20 carbon atoms, a quaternary ammonium group or a phosphonium group;

m represents an integer from 0–4;

n represents an integer from 0–2; and $X^-$ represents an anion;

any two of Y or Z can together represent a 5- to 7-membered saturated or unsaturated hetero- or carbocyclic fused ring; and any of $R_1$ and $R_2$, $R_3$ and $R_4$, $R_1$ and Y, and $R_4$ and Z can be combined to form a 5- to 7-membered hetero- or carbocyclic ring.

In a preferred embodiment of the invention, $R_1$ in the above formula represents H or methyl. In another preferred embodiment, $R_2$ represents H, methyl, ethoxycarbonyl or phenyl. In another preferred embodiment, $R_3$ represents methyl, ethyl, allyl or phenyl. In still another preferred embodiment, $R_4$ represents methyl, ethyl or allyl. In yet another preferred embodiment, Y represents H. In still yet another preferred embodiment, Z represents H, cyano, methyl or phenyl.

In the above definition, examples of a substituted or unsubstituted alkyl group include methyl, ethyl, isopropyl, hydroxyethyl, 3-(N,N-dimethylamino)propyl and benzyl. Examples of a substituted or unsubstituted aryl group include phenyl, naphthyl and 4-chlorophenyl. Examples of a substituted or unsubstituted hetaryl group include pyridyl, imidazolyl and quinolyl. Examples of a polyoxyalkylene group of 2–20 alkylene oxide residues include 3,6,9-trioxadecyl, 11-hydroxy-3,6,9-trioxa-5,8-dimethyldodecyl and 11-hydroxy-3,6,9-trioxaundecyl. Examples of halogen include chloro, fluoro, bromo and iodo. Examples of a substituted or unsubstituted alkoxy group include methoxy, isopropoxy and 2-hydroxyethoxy. Examples of a substituted or unsubstituted alkoxy- or aryloxy-carbonyl group of 1–10 carbon atoms include methoxycarbonyl, ethoxycarbonyl, 2-methoxy-ethoxycarbonyl and phenoxycarbonyl. Examples of a substituted or unsubstituted alkyl-, aralkyl-, aryl-, diaryl- or dialkyl carbamoyl group include N-methylcarbamoyl, N-methyl-N-phenyl-carbamoyl, N-p-(trimethylammonium)-phenylcarbamoyl and N,N-bis (4-dimethylaminophenyl)carbamoyl. Examples of a substituted or unsubstituted alkyl-, aralkyl-, aryl-, diaryl- or dialkyl sulfamoyl group include N-methyl-sulfamoyl, N-methyl-N-phenyl-sulfamoyl, N-p-(trimethylammonium)-phenylsulfamoyl and N,N-bis (4-dimethylaminophenyl)-sulfamoyl. Examples of an acylamino group include acetamido, methoxyethyl-acetamido and benzamido. Examples of a ureido group include N-methylureido, ureido and N,N'-dimethylureido. Examples of a sulfonylamino group include methanesulfonamido, p-toluenesulfonamido and 2-(trimethlyammonium)-ethanesulfonamido. Examples of a substituted or unsubstituted alkyl-, aralkyl-, aryl-, diaryl- or dialkyl-amino group include methylamino, N,N-dimethylamino, methoxyethylamino and anilino. Examples of a quaternary ammonium group include trimethylammonium and benzyldimethylammonium. Examples of a phosphonium group include triphenylphosphonium and trimethlyphosphonium.

Examples of $X^-$ include chloride, methosulfate, acetate, chloroacetate, trifluoroacetate, methanesulfonate, p-toluenesulfonate, lactate, citrate, gluconate and 3-ureidopropionate. In a preferred embodiment, $X^-$ is methosulfate or lactate.

As noted above, the dyes which are employed in the invention and the synthesis thereof are described in EPA 624628, the disclosure of which is hereby incorporated by reference.

The water solubility of cationic dyes is significantly affected by the nature of the counterion $X^-$. The counterion preferred for solubility is often not readily incorporated during the synthesis. Ion exchange via ion exchange resins or dialysis/ultrafiltration is often difficult, time consuming and/or expensive. In addition, it is often difficult to isolate, purify and characterize the preferred salt forms of the dyes due to their high water solubility.

A particularly preferable embodiment of this invention results when $R_1$ in the structure I above is H. In this case, the electrically neutral, deprotonated form of the cationic dye (e.g., II below) may conveniently be isolated by treatment of the cationic dye with a base, purified and characterized. The cationic dye with the desired counterion may be regenerated by simply dissolving the electrically neutral form of the dye in an aqueous solution of the conjugate acid of the counterion during the preparation of the ink. This process is shown by the following:

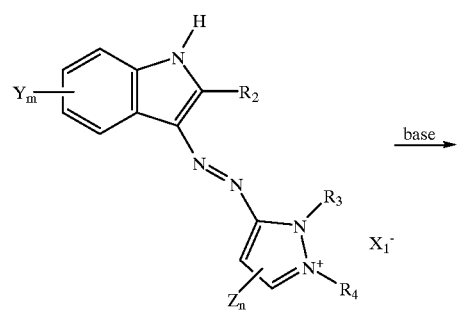

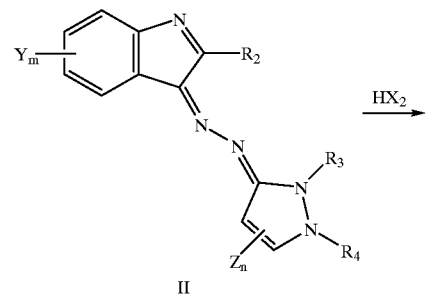

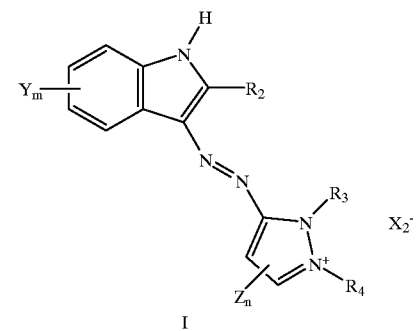

A method for preparing the desired salt forms of the dyes used in the invention via the electrically neutral, deprotonated forms of the cationic quaternized pyrazoleazoindole dyes according to structure II is described in the Examples hereinafter.

Representative examples of electrically neutral, deprotonated forms of the cationic quaternized pyrazoleazoindole dyes used in this invention are listed below.

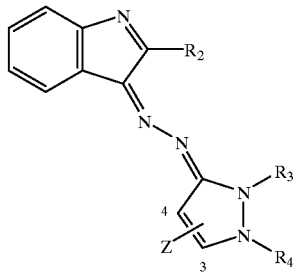

| Dye | $R_2$ | $R_3$ | $R_4$ | Z | λ-max of Cationic Form[1] |
|---|---|---|---|---|---|
| 1 | $CH_3$ | $CH_3$ | $CH_3$ | 4-CN | 453, 451[2] |
| 2 | $CH_3$ | $C_2H_5/CH_3$ mixture | $CH_3/C_2H_5$ mixture | 4-CN | 456 |
| 3 | $CH_3$ | $C_2H_5$ | $C_2H_5$ | 4-CN | 457 |
| 4 | $CH_3$ | allyl/$CH_3$ mixture | $CH_3$/allyl mixture | 4-CN | 458 |
| 5 | $CH_3$ | $C_6H_5$ | $CH_3$ | 4-CN | 466, 466[2] |
| 6 | $CH_3$ | $C_6H_5$ | $CH_3$ | 3-$CH_3$ 4-CN | 466 |
| 7 | $CH_3$ | 2-$CH_3C_6H_4$ | $CH_3$ | 4-CN | 468, 466[2] |
| 8 | $CH_3$ | $CH_3$ | $CH_3$ | 3-$C_6H_5$ | 432 |
| 9 | $CH_3$ | $C_2H_5$ | $CH_3$ | 3-$C_6H_5$ | 434, 433[2] |
| 10 | $CH_3$ | $C_6H_5$ | $CH_3$ | 3-$CH_3$ | 437, 440[2] |
| 11 | $CH_3$ | $C_6H_5$ | $C_2H_5$ | H | 440, 441[2] |
| 12 | $CH_3$ | 4-$CH_3OC_6H_4$ | $CH_3$ | 3-$CH_3$ | 436 |
| 13 | $CH_3$ | $CH_2CF_3$ | $CH_3$ | 3-$CH_3$ | 446 |

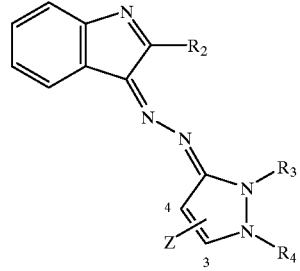

| Dye | $R_2$ | $R_3$ | $R_4$ | Z | λ-max of Cationic Form[1] |
|---|---|---|---|---|---|
| 14 | $C_6H_5$ | $CH_3$ | $CH_3$ | 4-CN | 481 |
| 15 | $CO_2C_2H_5$ | $CH_3$ | $CH_3$ | 4-CN | 444 |
| 16 | $CO_2C_2H_5$ | $C_2H_5/CH_3$ mixture | $CH_3/C_2H_5$ mixture | 4-CN | 446 |
| 17 | $C_6H_5$ | $CH_3$ | $CH_3$ | 3-$C_6H_5$ | 449[2] |
| 18 | $C_6H_5$ | $C_6H_5$ | $CH_3$ | 3-$CH_3$ | 463, 459[2] |

1. Measured in ethanol containing dilute HCl
2. Measured in 5% aqueous acetic acid Other dyes used in this invention include:

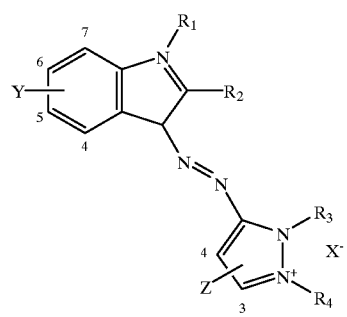

| Dye | $R_1$ | $R_2$ | $R_3$ | $R_4$ | Y | Z | $X^-$ |
|---|---|---|---|---|---|---|---|
| 19 | $CH_3$ | $CH_3$ | $C_2H_5OH$ | $CH_3$ | 5-$OCH_3$ | 3-$CH_3$ | $CH_3OSO_3^-$ |
| 20 | allyl | $CH_3$ | 2-pyridyl | $CH_3$ | 5,7-$(CH_3)_2$ | 4-$CONH_2$ | 4-$CH_3C_6H_4SO_3^-$ |
| 21 | $(CH_3)_3N^+C_3H_6Cl^-$ | $C_2H_5$ | $CH_3$ | allyl | 5-Cl | 3-$C_6H_5$ | $Cl^-$ |
| 22 | $NCC_2H_4$ | $C_6H_5$ | $C_6H_5$ | $C_2H_5OH$ | 5-$NO_2$ | 4-$CONHCH_3$ | $CF_3CO_2^-$ |
| 23 | $C_6H_5CH_2$ | H | —$C_3H_6$— | | 5,6-$(CH_3O)_2$ | 4-$NO_2$ | $CH_3SO_3^-$ |
| 24 | $CH_3$ | $CH_3$ | $CH_3$ | $CH_3$ | 6,7-benzo | 3-$C_6H_5$ | $CH_3OSO_3^-$ |
| 25 | $CH_3$ | $C_6H_5$ | $C_6H_5$ | $CH_3$ | H | 4-CN | $CH_3OSO_3^-$ |
| 26[1] | $CH_3$ | H | $CH_3$ | $CH_3$ | H | 4-CN | $CH_3OSO_3^-$ |

1. λ-max = 451 (measured in 5% aqueous acetic acid)

In general, the above dyes comprise from about 0.2 to about 5%, preferably from about 0.5 to about 3% by weight of the ink jet ink composition.

A humectant is employed in the ink jet composition of the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. A preferred humectant for the composition of the invention is diethylene glycol, glycerol, or diethylene glycol monobutylether.

Water-miscible organic solvents may also be added to the aqueous ink of the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

Surfactants may be added to adjust the surface tension of the ink to an appropriate level. The surfactants may be anionic, cationic, amphoteric or nonionic.

A biocide may be added to the composition of the invention to suppress the growth of micro-organisms such as molds, fungi, etc. in aqueous inks. A preferred biocide for the ink composition of the present invention is Proxel® GXL (Zeneca Specialties Co.) at a final concentration of 0.0001–0.5 wt. %.

The pH of the aqueous ink compositions of the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A typical ink composition of the invention may comprise, for example, the following substituents by weight: colorant (0.05–20%), water (20–95%), a humectant (5–70%), water miscible co-solvents (2–20%), surfactant (0.1–10%), biocide (0.05–5%) and pH control agents (0.1–10%).

Additional additives which may optionally be present in the ink jet ink composition of the invention include thickeners, conductivity enhancing agents, anti-kogation agents, drying agents, and defoamers.

The ink jet inks provided by this invention may be employed in ink jet printing wherein liquid ink drops are applied in a controlled fashion to an ink receptive layer substrate, by ejecting ink droplets from a plurality of nozzles or orifices of the print head of an ink jet printer.

Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

The following examples illustrate the utility of the present invention.

EXAMPLES

Synthesis of Dye 10

The following procedure is representative of the procedures used to prepare the cationic pyrazole azoindole dyes employed in this invention and their deprotonated, electrically neutral precursors.

To a cold (0–5° C.) mixture of nitrosylsulfuric acid freshly prepared from 14.5 g, 0.1785 mole, sodium nitrite and 200 g concentrated sulfuric acid and 150 ml of a 1:5 mixture of propionic and acetic acids (1:5 acid) was added 34.6 g, 0.2 mole, of 1-phenyl-3-methyl-5-aminopyrazole. After stirring at 0–5° C. for 2 hr., excess nitrous acid was destroyed by adding 0.5 g of urea and the mixture was added to a solution of 26.2 g, 0.17 mole, 2-methylindole in 500 ml of acetic acid at ambient temperature. After stirring for 1 hour, 250 g sodium acetate was added, followed by 300 ml of water. After stirring an additional 1 hour, 2000 ml of water was added and the solid was collected by filtration and washed well with water. The crude product was then digested with 500 ml of boiling acetonitrile, cooled and filtered to yield 52.5 g of 2-methyl-3-(1-phenyl-3-methylpyrazol-5-ylazo)-indole as a yellow solid.

To a suspension of 49 g, 0.124, mole of the above pyrazoleazoindole dye in 425 ml of butyronitrile was added 115.5 g, 0.62 mole, of methyl-p-toluenesulfonate and the resulting mixture heated at reflux for 3 hours. Cooling to 0–5° C., collecting the solid, rinsing with cold butyronitrile followed by ethyl ether and drying yielded 66.16 g (85% of theory) of 2-methyl-3-(1-phenyl-2,3-dimethylpyrazol-5-ylazo)-indolium p-toluenesulfonate as an orange-yellow solid.

To a solution of 36.5 g, 0.0729 mole of the above cationic dye p-toluenesulfonate in a mixture of 750 ml methanol and 100 ml water was added 58 ml of a 10% aqueous solution of sodium hydroxide. After stirring at ambient temperatures for 1 hour the mixture was diluted with 1500 ml of water and the resulting solid was collected by filtration and dried to yield 23.84 g (99.3% of theory) of Dye 10, $\lambda$-max=440 nm in 5% aqueous acetic acid.

The following control dyes were evaluated as comparative examples:

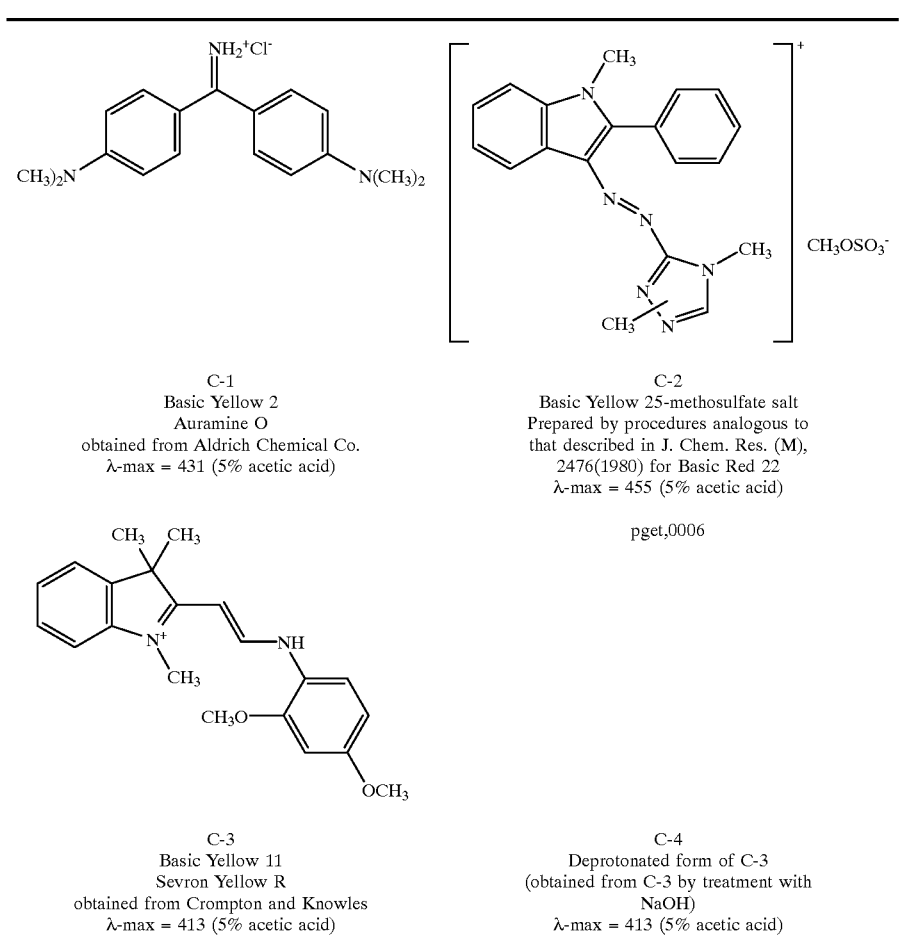

C-1
Basic Yellow 2
Auramine O
obtained from Aldrich Chemical Co.
λ-max = 431 (5% acetic acid)

C-2
Basic Yellow 25-methosulfate salt
Prepared by procedures analogous to
that described in J. Chem. Res. (M),
2476(1980) for Basic Red 22
λ-max = 455 (5% acetic acid)

C-3
Basic Yellow 11
Sevron Yellow R
obtained from Crompton and Knowles
λ-max = 413 (5% acetic acid)

C-4
Deprotonated form of C-3
(obtained from C-3 by treatment with NaOH)
λ-max = 413 (5% acetic acid)

Preparation of Inks

Inks containing the dyes of the invention and control dyes were prepared by dissolving an appropriate amount of the dye in deionized water containing humectants of diethylene glycol and glycerol, each at 6 wt. %, a biocide, Proxel GXL ® at 0.003 wt. % and a surfactant, Surfynol 465 ® (Air Products Co.) at 0.5 wt. %. Lactic acid was optionally added to help solubilize the dyes and/or convert the electrically neutral, deprotonated forms of the dyes into the corresponding lactate salts.

The dye concentrations were based on solution absorption spectra and chosen such that the final ink, when diluted 1:1000, would yield a transmission optical density of approximately 1.0. In the case of control dye C-3, the dye was too insoluble to prepare an ink of the proper concentration even with added lactic acid. Utilizing the deprotonated form (C-4) along with lactic acid yielded a more water soluble salt and enabled an ink to be formulated. Table 1 gives the various ink details.

TABLE 1

| Ink | Dye | Wt. % Dye | Wt. % Lactic Acid |
|-----|-----|-----------|-------------------|
| 1 | 1 | 0.99 | 2.5 |
| 2 | 9 | 1.17 | 2.5 |
| 3 | 10 | 1.18 | 0.5 |
| 4 | 11 | 1.16 | 2.5 |

TABLE 1-continued

| Ink | Dye | Wt. % Dye | Wt. % Lactic Acid |
|-----|-----|-----------|-------------------|
| 5 | 17 | 1.60 | 2.5 |
| 6 | 18 | 1.58 | 2.5 |
| 7 | 26 | 1.35 | — |
| C-1 | C-1 | 0.88 | 1.7 |
| C-2 | C-2 | 1.97 | 0.7 |
| C-3 | C-3 | Insufficient solubility | — |
| C-4 | C-4 | 0.8 | 5 |

Printing of Test Images

The above inks were then filtered through a 0.45μ polytetrafluoroethylene filter and placed in a clean Hewlett-Packard ink cartridge No. HP 51629A and fitted into the black ink station of a Hewlett-Packard DeskJet 600 ® printer. A test image consisting of a series of 21 variable density patches, approximately 15 by 13 mm in size, ranging from 5% dot coverage to 100% dot coverage was printed onto commercially-available Kodak Inkjet Photographic Quality Paper, Catalog No. 899-9161, and allowed to dry for 24 hours at ambient temperature and humidity.

Evaluation of Test Images

The Status A red, green and blue reflection densities of the maximum patch of the above stepped images were measured using an X-Rite® 820 densitometer. The D-max blue density is listed in Table 2. Maximum densities of more than 1.5 are acceptable. The ratio of blue to green (B/G) densities, a measure of color purity, was also calculated for each of the printed images. High B/G ratios indicate less unwanted absorptions and better color purity which are preferred.

The stepped images were then subjected to light fade under 50 Klux high-intensity daylight irradiation and 50% relative humidity conditions for 1 week. The Status A blue densities of the stepped images were remeasured and the % loss in Status A blue density for the D-max patches was calculated. Losses of less than 10% are preferred.

TABLE 2

| Ink | Blue D-max | % Loss Light Fade | B/G Ratio |
|-----|------------|-------------------|-----------|
| 1   | 2.2        | 4                 | 13        |
| 2   | 1.9        | 2                 | 17        |
| 3   | 2.0        | 3                 | 20        |
| 4   | 2.0        | 1                 | 13        |
| 5   | 2.2        | 1                 | 4         |
| 6   | 2.1        | 3                 | 3         |
| 7   | 1.8        | 6                 | 7         |
| C-1 | 1.7        | 87                | —         |
| C-2 | 2.0        | 3                 | 7         |
| C-4 | 1.8        | 16                | —         |

The above results show that the dyes employed in the invention are much more light stable than C-1 and C-4 of the prior art. The dyes employed in the invention also generally have better hue than C-2 along with equivalent or better light stability and density.

The invention has been described in detail with particular reference to certain preferred embodiments thereof, but it will be understood that variations and modifications can be effected within the spirit and scope of the invention.

What is claimed is:

1. An ink jet ink composition comprising water, a humectant, and a cationic azo dye derived from the quaternization of a pyrazoleazoindole dye.

2. The composition of claim 1 wherein said cationic azo dye derived from the quaternization of a pyrazoleazoindole dye has the following structure:

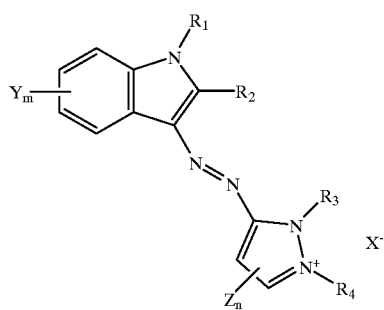

wherein:

$R_3$ and $R_4$ each independently represents a substituted or unsubstituted alkyl group of 1–6 carbon atoms, a substituted or unsubstituted allyl group, a substituted or unsubstituted aryl group of 6–10 carbon atoms, a substituted or unsubstituted hetaryl group of 5–10 atoms or a polyoxyalkylene group of 2–20 alkylene oxide residues;

$R_1$ represents hydrogen or the same groups as listed above for $R_3$ and $R_4$;

$R_2$, Y and Z each independently represents the same groups listed above for $R_1$, halogen, nitro, cyano, a substituted or unsubstituted alkoxy group of 1–6 carbon atoms, a substituted or unsubstituted alkoxy- or aryloxy-carbonyl group of 1–10 carbon atoms, carbamoyl, a substituted or unsubstituted alkyl-, aralkyl-, aryl-, diaryl- or dialkyl-carbamoyl group of 1–20 carbon atoms, sulfamoyl, a substituted or unsubstituted alkyl-, aralkyl-, aryl-, diaryl- or dialkyl-sulfamoyl group of 1–20 carbon atoms, acylamino, ureido, sulfonylamino, amino, a substituted or unsubstituted alkyl-, aralkyl-, aryl-, diaryl- or dialkyl-amino group of 1–20 carbon atoms, a quaternary ammonium group or a phosphonium group;

m represents an integer from 0–4;

n represents an integer from 0–2; and $X^-$ represents an anion;

any two of Y or Z can together represent a 5- to 7-membered saturated or unsaturated hetero- or carbocyclic fused ring; and and any of $R_1$ and $R_2$, $R_3$ and $R_4$, $R_1$ and Y, and $R_4$ and Z can be combined to form a 5- to 7-membered hetero- or carbocyclic ring.

3. The composition of claim 2 wherein $R_1$ represents H or methyl.

4. The composition of claim 2 wherein $R_2$ represents H, methyl, ethoxycarbonyl or phenyl.

5. The composition of claim 2 wherein $R_3$ represents methyl, ethyl, allyl or phenyl.

6. The composition of claim 2 wherein $R_4$ represents methyl, ethyl or allyl.

7. The composition of claim 2 wherein $X^-$ represents methosulfate or lactate.

8. The composition of claim 2 wherein Y represents H.

9. The composition of claim 2 wherein Z represents H, cyano, methyl or phenyl.

10. The composition of claim 1 wherein said humectant is diethylene glycol, glycerol or diethylene glycol monobutylether.

11. The composition of claim 1 wherein said dye comprises about 0.2 to about 5% by weight of said ink jet ink composition.

* * * * *